US011619096B2

(12) United States Patent
Scott

(10) Patent No.: US 11,619,096 B2
(45) Date of Patent: Apr. 4, 2023

(54) DRILL ASSEMBLY AND VALVE

(71) Applicant: UGT Group Pty Ltd, Swan View (AU)

(72) Inventor: Max Scott, Perth (AU)

(73) Assignee: UGT Group Pty Ltd, Swan View (AU)

( * ) Notice: Subject to any disclaimer, the term of this patent is extended or adjusted under 35 U.S.C. 154(b) by 0 days.

(21) Appl. No.: 16/626,841

(22) PCT Filed: Jun. 26, 2018

(86) PCT No.: PCT/AU2018/050649
§ 371 (c)(1),
(2) Date: Dec. 26, 2019

(87) PCT Pub. No.: WO2019/000033
PCT Pub. Date: Jan. 3, 2019

(65) Prior Publication Data
US 2020/0165873 A1    May 28, 2020

(30) Foreign Application Priority Data

Jun. 26, 2017   (AU) ................. 2017902457

(51) Int. Cl.
| E21B 19/087 | (2006.01) |
| E21B 7/02 | (2006.01) |
| B23B 45/00 | (2006.01) |
| B25D 17/28 | (2006.01) |
| F16K 11/22 | (2006.01) |
| E21B 19/086 | (2006.01) |

(52) U.S. Cl.
CPC ............ *E21B 7/022* (2013.01); *B23B 45/003* (2013.01); *B25D 17/28* (2013.01); *E21B 7/027* (2013.01); *E21B 19/086* (2013.01); *E21B 19/087* (2013.01); *F16K 11/22* (2013.01)

(58) Field of Classification Search
CPC ............................ E21B 19/086; E21B 19/087
See application file for complete search history.

(56) References Cited

U.S. PATENT DOCUMENTS

| 1,551,098 A * | 8/1925 | Gilman | ................... E21B 21/01 |
| | | | 173/36 |
| 1,593,629 A * | 7/1926 | Hansen | ................. E21B 15/006 |
| | | | 173/132 |
| 2,747,610 A | 5/1956 | Jan et al. | |

(Continued)

FOREIGN PATENT DOCUMENTS

| EP | 0367875 A1 | 5/1990 |
| WO | 2016123663 A1 | 8/2016 |

OTHER PUBLICATIONS

International Searching Authority, International Search Report and Written Opinion issued in connection with International Patent Application No. PCT/AU2018/050649, dated Aug. 14, 2018, 13 pages.

*Primary Examiner* — Giovanna Wright
(74) *Attorney, Agent, or Firm* — Nyemaster Goode, P.C.

(57) ABSTRACT

The present invention provides a drill assembly that includes a drill for drilling rock, a support for supporting the drill, and a valve for releasably securing the support and drill together. The valve is adapted to receive a fluid from a pump means and controllably provide the drill and the support with the fluid for operation of the drill and the support.

19 Claims, 10 Drawing Sheets

(56) References Cited

U.S. PATENT DOCUMENTS

| | | | |
|---|---|---|---|
| 2,908,482 A | | 10/1959 | Curtis et al. |
| 3,245,484 A | | 4/1966 | Ekwall |
| 5,107,933 A | * | 4/1992 | Wuhrer .................. E21B 21/00 173/1 |
| 2003/0164242 A1 | | 9/2003 | Richter et al. |

* cited by examiner

DRILL ASSEMBLY AND VALVE

CROSS-REFERENCE TO RELATED APPLICATIONS

This application is a U.S. National Stage Entry of International Patent Application No. PCT/AU2018/050649, filed Jun. 26, 2018, entitled DRILL ASSEMBLY AND VALVE, which claims the benefit of Australian Patent Application No. 2017902457, filed Jun. 26, 2017, entitled DRILL ASSEMBLY AND VALVE. Each of these prior applications are incorporated herein by reference in their entirety and for all purposes.

FIELD OF THE INVENTION

The present invention generally relates to a drill assembly and valve. In particular the invention relates to a hydraulic drill assembly having a drill and support leg for rock drilling.

The invention also has other applications including jack hammers and impact wrenches, and rock breakers.

BACKGROUND ART

A rock drill is, as its name suggests, a drill for penetrating rock. These drills are widely used in the mining industry and are often used in very harsh conditions. These drills are typically manually handled by an operator and are combined with a support leg which provides the operator with additional forward thrust and support to drive the drill bit into the rock.

Rock drills are typically a percussion tool with a hammering action. This action provides a short, rapid hammer thrust to a drill bit, allowing the drill to proceed further into the rock with less effort than a conventional drilling action. When drilling rock the hammering action transfers significant force to the rock face through the drill bit. The hammering effect in a rock drill is typically caused by the action of a reciprocating piston fixed to a drill shank moving rapidly in a drill housing whilst the shank is rotating. The shank receives a drill steel which provides the drill bit at a distal end thereto. The drill steel is generally threadingly received in the shank.

Drills are typically pneumatically driven. The compressed air for the drill is provided by a supply line which, in the case of underground mining, extends from compressors located at the surface, to the drilling face of the mine. When the drilling face is near the surface the infrastructure to supply the compressed air is not significant. However, as the mine deepens the cost to extend the required infrastructure is considerable. Furthermore, the driller will often experience a drop of efficiency as the reliability of compressed air supplied at the required pressure decreases with an increase in drilling depth.

Another disadvantage of pneumatically driven drills is the noise made by the drills. In the close confines of a mine shaft this noise is amplified rendering the work conditions very difficult particularly if drilling for a prolonged period of time.

The use of compressed air also generates significant dust in the confines of the mine shaft. This, together with the noise created by the drill, contributes significantly to the pollution in the shaft.

Another problem with drills used for rock drilling is that the drills only have a forward motion and a neutral motion. This can prove inefficient when drilling a deep hole which, after reaching a certain depth, requires a longer drill steel to be used. As the drill steel is threadingly received relative to the drill it is not possible to rotate the drill steel relative to the drill in a manner which will release the drill steel while the drill steel remains in the hole. In order for an operator to replace the drill steel from the drill during a drilling operation, the operator must first remove the drill steel from the hole and remove the drill steel from the drill before a drill steel extension or a longer drill steel is attached.

Most drilling operations rely on the support leg to support the drill and to push the drill forward. The support leg is releasably connected to the drill at one end while the other end is adapted to be supported by the ground or wall of the shaft. The support leg is typically telescopic in nature and can be readily adjusted to the required length. Support legs rely on air or fluid to activate the support leg in order to provide the requisite support and forward force.

When the support leg utilises air, an air supply line from the surface is required. As a result air support legs face the same issues as pneumatically driven drills in relation to reliability of compressed air at the required pressure, in addition to the costs associated with the required infrastructure to supply the air.

Fluid activated support legs typically use water and generally are not configurable to provide telescopic adjustment. This can be significant as it limits the scope of the support leg before it requires repositioning, but it also renders the leg slow/difficult to retract to a smaller size. As water is required during the drilling operations to flush the rock from the hole, in addition to keeping the drill bit cool, there is a ready supply of water for the support leg. However, the water must be pressurised by a pump in order to activate the support leg. This requires additional infrastructure and set up.

Regardless of whether the support leg uses air or a fluid, the support leg and control thereof is independent of the drill. Both require adjustment during the drilling process to ensure the driller is operating as efficiently as possible.

The preceding discussion of the background to the invention is intended only to facilitate an understanding of the present invention. It should be appreciated that the discussion is not an acknowledgment or admission that any of the material referred to was part of the common general knowledge as at the priority date of the application.

SUMMARY OF INVENTION

It is an object of this invention to provide a drill assembly and valve which ameliorates, mitigates or overcomes, at least one disadvantage of the prior art, or which will at least provide the public with a practical choice.

The present invention provides a drill assembly comprising a drill for drilling rock, a support for supporting the drill, a valve for releasably securing the support and drill together, wherein the valve is adapted to receive a fluid from a pump means and controllably provide the drill and the support with the fluid for operation of the drill and the support.

The present invention provides a drill assembly comprising a drill for drilling rock, a support for supporting the drill, a valve for releasably securing the support and drill together, wherein the valve is adapted to receive a single fluid from a pump means and controllably provide both the drill and the support with the single fluid for operation of the drill and the support.

The drill may be a rock drill, jack hammer or an impact wrench.

The support may be in the form of a support leg. The support leg may have a first end adapted to be releasably secured to the valve. Once secured to the valve the support leg may be rotatably adjusted relative to the valve. The support leg may comprise a second end adapted to engage with or be supported upon a surface, such as the floor in the mine shaft, or a wall of the mine shaft.

The support leg may comprise two or more pipes received in each other such that they are telescopic.

The drill may comprise a housing adapted to support a drill bit.

Preferably the housing provides a shank having a first end adapted to threadingly engage a drill steel, whereby the drill steel has the drill bit at an opposed end for engaging the rock formation.

Preferably the shank has a second end adapted to be received in a driver of the drill whereby the driver exerts a rotational force on the shank.

The drill may have three modes of operation, a forward mode wherein the force exerted through the drill bit drives the drill bit forward, a neutral mode wherein no force is exerted through the drill bit, and a reverse mode wherein the drill may be rotated in a reverse direction to decouple the drill from the drill bit. In the reverse mode it is possible to leave the drill bit in the hole, and detach the drill from the drill bit. A drill steel extension can then be connected to the drill steel and the drill can be reconnected to the drill steel and drill steel extension. As a result an operator is able to drill a deeper hole without having to remove and change the drill steel from the drill.

The drill may have a separate rotation motor to allow the drill to operate in the reverse mode.

The pump means may be in the form of a portable hydraulic power pack.

The power pack may provide a pressurised hydraulic fluid to the drill assembly.

The power pack may be in fluid communication with the valve. The valve may be in fluid communication with the drill. The valve may be in fluid communication with the support leg. The drill may be in fluid communication with the power pack.

The valve may comprise a first valve inlet for receiving the fluid from the power pack.

The first valve inlet may be in fluid communication with a first valve outlet. The first valve outlet may be in fluid communication with a drill inlet. Fluid from the power pack may flow through the first valve inlet, through the first valve outlet and into the drill inlet to operate the drill.

In one embodiment the valve comprises a three way joiner, such as a tee-piece wherein a first branch provides the first valve outlet, a second branch is connected to the power pack and a third branch may provide the first valve inlet.

The drill may have a drill outlet. The drill outlet may be in fluid communication with the power pack whereby fluid flows through the drill outlet back to the power pack.

The valve may have a second valve outlet. The second valve outlet may be in fluid communication with a support inlet for delivering fluid to the support leg. Fluid from the power pack may flow through the first valve inlet, through the second valve outlet and into the support leg through the support inlet to activate the support leg.

Fluid from the support leg may return to the valve, passing through a support outlet and into a second valve inlet of the valve, before passing through a return outlet back to the power pack.

In a preferred embodiment the fluid from the valve enters and exits the support leg through the same pathway. In such an embodiment the support outlet and the support inlet are the same and the second valve inlet and second valve outlet are the same.

The valve may incorporate a regulator to prevent the flow of fluid to the drill inlet if the pressure of the fluid being delivered to the support leg is outside predetermined parameters. For instance, flow of fluid to the drill may be stopped if the pressure of the support leg is caused to exceed 100 psi. The regulator may be adjusted to set the predetermined parameters, therefore adjusting the behaviour of the valve. An event which causes pressure in the support leg to exceed 100 psi can have serious consequences. For the safety of the operators it is highly desirable that the fluid being used to operate the drill cease flowing thereto as soon as an event results in the pressure in the support leg exceeding predetermined parameters.

The valve may have a throttle for regulating the flow of fluid to the support leg. The throttle allows for rapid extension and contraction of the support leg.

The drill may have a drill throttle for controlling the speed of the drill.

A hammer in the drill may be adapted to be driven by the fluid entering the drill in both directions. When the hammer is being driven in one direction the drill is in forward mode. When the hammer is being driven in the other direction the drill is in reverse mode.

The valve may have a dump valve for dumping fluid back to the power pack. Operation of the dump valve may cause the fluid to pass straight through the valve without flowing to the drill or support leg. This allows the operator to safely change the drill steel. Once the drill steel has been replaced the dump valve can be returned to its off position causing the fluid to be delivered to the support leg and the drill allowing the drilling operation to continue.

The power pack may be provided by the hydraulics of a truck

The drill may have a flushing fluid inlet. A flushing medium which is delivered to the rock formation during drilling may pass through the flushing fluid inlet to the drill bit. The flushing medium may be water, air or a combination of both.

Preferably the drill housing and other components of the drill are made from aluminium.

The present invention further provides a valve adapted to secure a drill to a support leg, the valve is adapted to control the flow of a hydraulic fluid from a hydraulic power pack to the support leg and the drill, the valve comprises a body having a first valve inlet adapted to be in fluid communication with the power pack, a first fluid outlet adapted to be in fluid communication with the drill, a second fluid outlet adapted to be in fluid communication with the support leg, a return outlet adapted to be in fluid communication with the power pack to return fluid thereto, wherein the valve incorporates a dump valve which is movable between a normal position for normal operation, and a dump position wherein fluid is caused to pass through the valve and return to the power pack without diverting to the support leg or drill.

The present invention further provides a valve adapted to secure a drill to a support leg, the valve is adapted to control the flow of a hydraulic fluid from a hydraulic power pack to the support leg and the drill, the valve comprises a body having a first valve inlet adapted to be in fluid communication with the power pack, a first fluid outlet adapted to be in fluid communication with the drill, a second fluid outlet adapted to be in fluid communication with the support leg, a return outlet adapted to be in fluid communication with the power pack to return fluid thereto, wherein the valve incorporates a regulator which, in operation, is adapted to stop the flow of fluid to the drill when the pressure of the fluid in the support leg exceeds a preselected parameter.

BRIEF DESCRIPTION OF THE DRAWINGS

The invention will be better understood by reference to the following description of a specific embodiment thereof as shown in the accompanying drawings in which.

In the attached drawings like structures are referred to by like numerals throughout the several views. The drawings shown are not necessarily to scale, with emphasis instead generally being placed upon illustrating the principles of the present invention.

BEST MODE(S) FOR CARRYING OUT THE INVENTION

Referring to the figures, the invention according to an embodiment is in the form of a drill assembly 11. In this embodiment the drill assembly 11 comprises a drill 13 for driving a drill steel 14, the drill 13 particularly adapted to be used for rock drilling in underground mining. However, it is to be appreciated that the present invention may have other applications such as a jackhammer and as an impact wrench. These and similar alternatives are considered to be within the scope of this invention.

Figure 1:
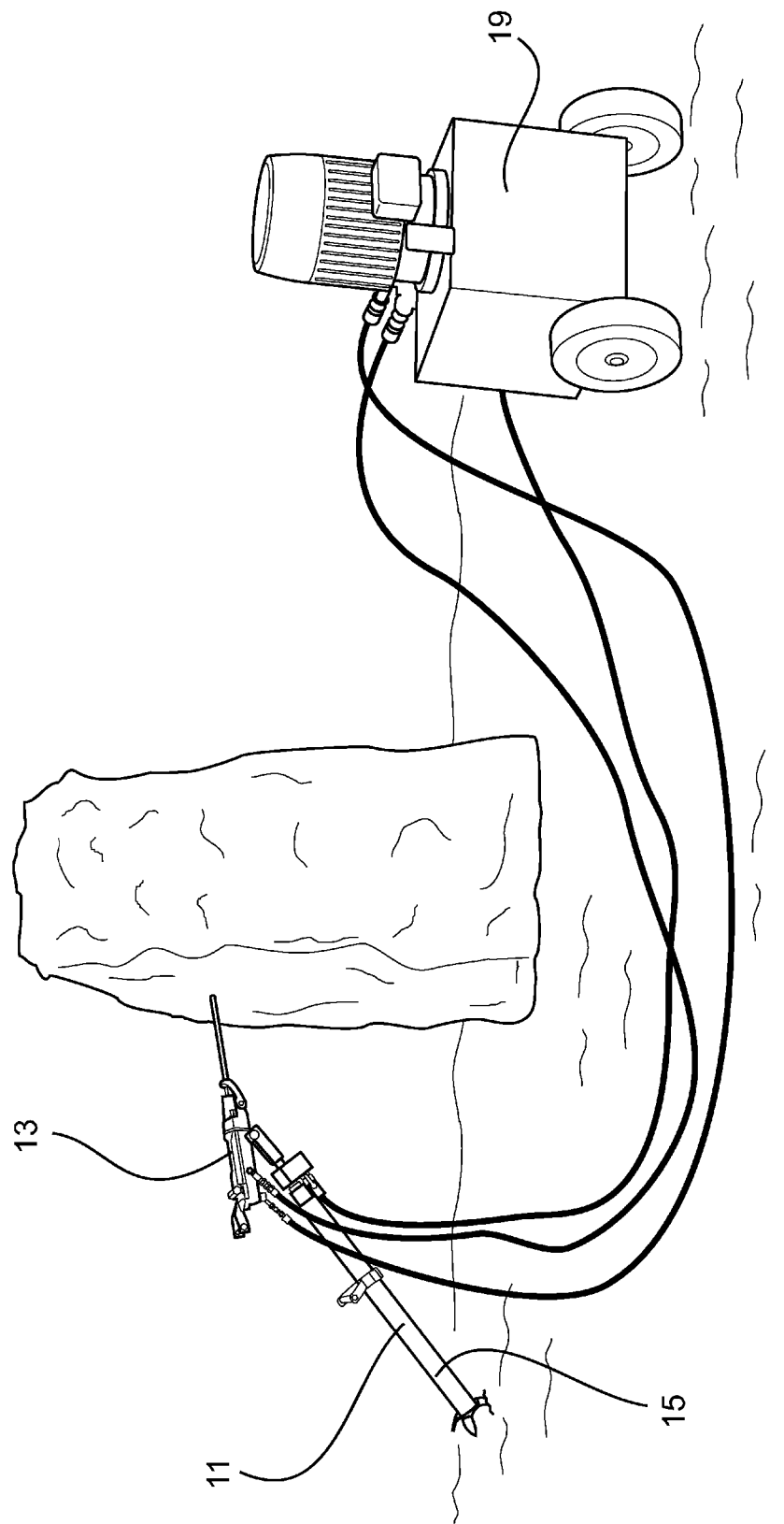
FIG. 1 is a cross sectional view of a drill assembly according to an embodiment of the invention wherein a drill bit is in a rock formation.
Figure 2:
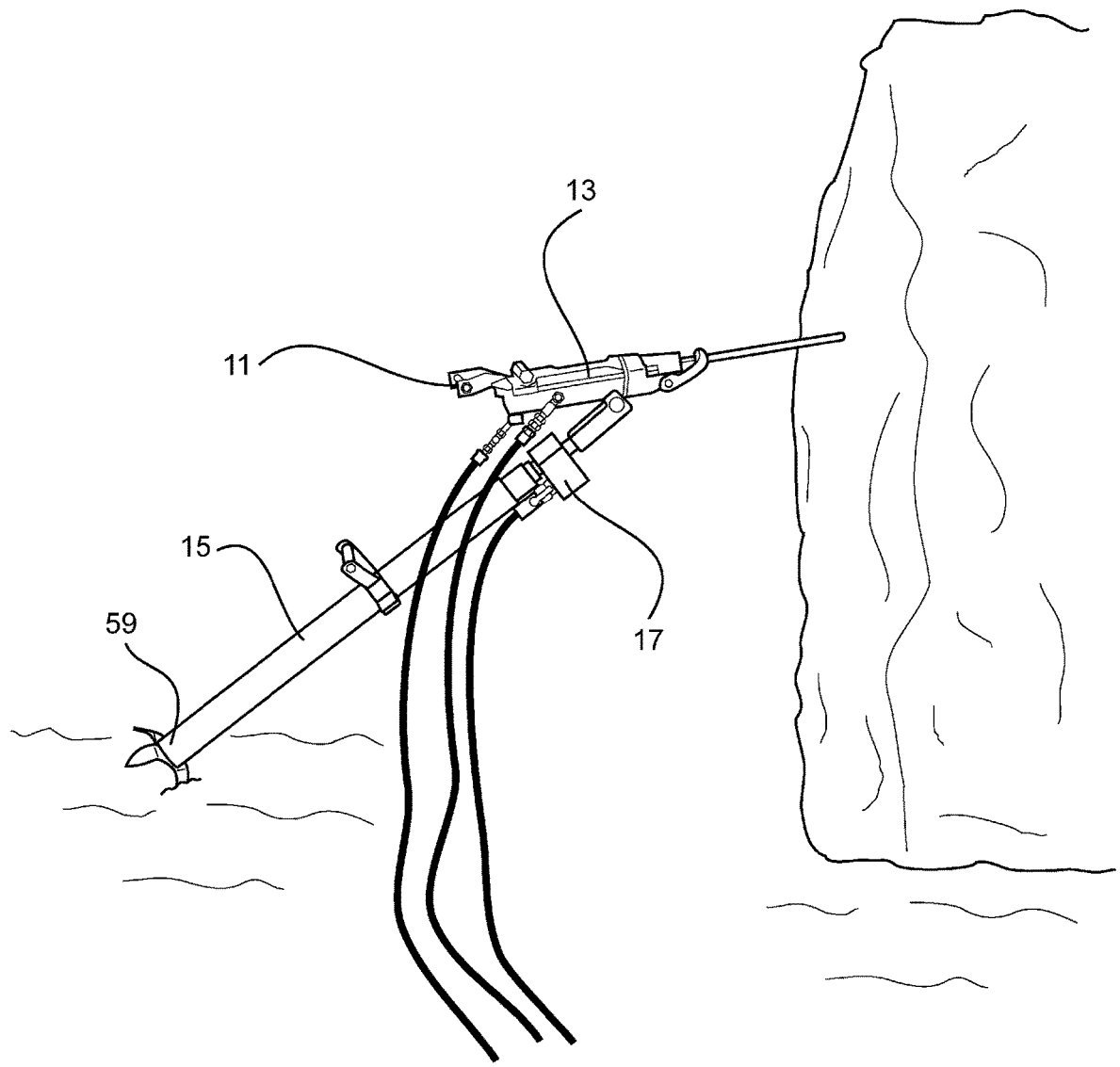
FIG. 2 is a view similar to FIG. 1 showing only the drill, support and valve of the drill assembly.
Figure 3:
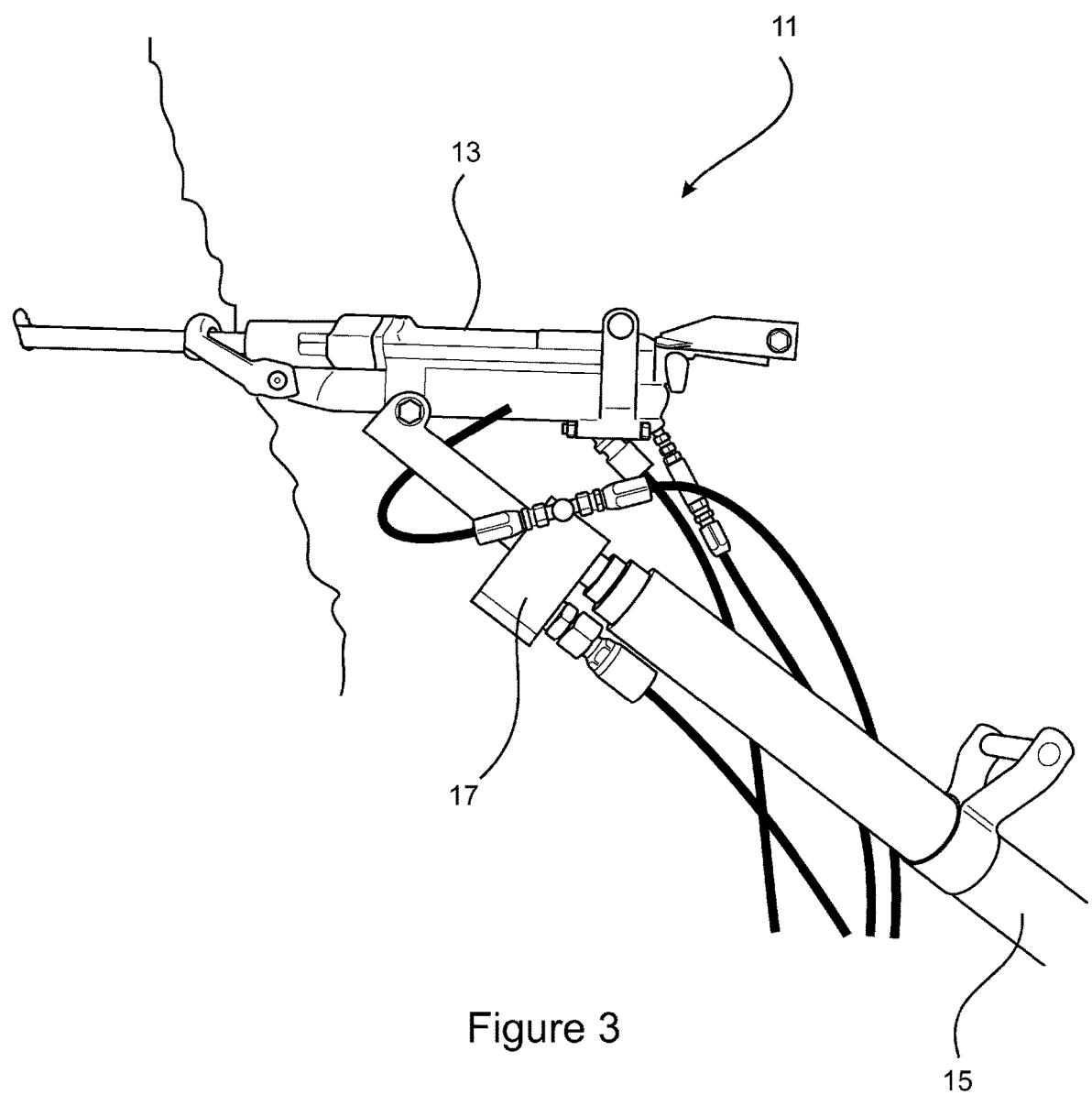
FIG. 3 is a closer view of FIG. 2.

As shown in FIGS. 1 to 3 the drill assembly 11 comprises the drill 13, a support in the form of a support leg 15 for supporting the drill 13, and a valve 17 which releasably secures the drill 13 to the support leg 15.

The valve 17 controls the flow of fluid from a pump means, which in this embodiment is in the form of a portable hydraulic power pack 19, to the drill 13 and support leg 15. In this embodiment the hydraulic power pack 19 provides hydraulic power to the drill assembly by supplying and receiving fluid in the form of oil.

Figure 4:
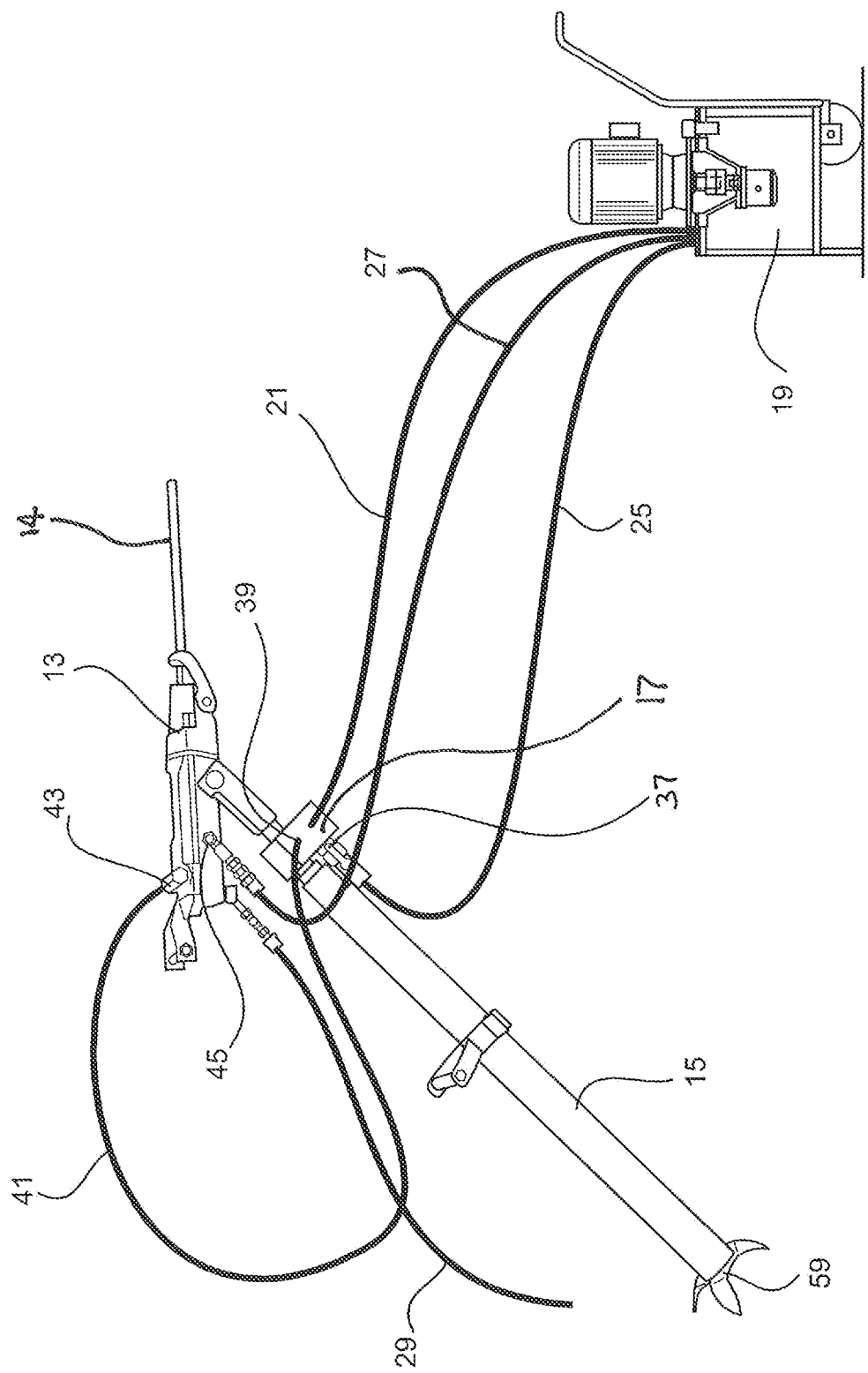
FIG. 4 is a schematic view of the fluid pathways of FIG. 1.

Referring to FIG. 4, the hydraulic power pack 19 has a first fluid supply line 21, for supplying fluid to the valve 17. The hydraulic power pack 19 also has a first fluid return line 25 for receiving returned fluid from the valve 17, and a second fluid return line 27 for receiving returned fluid from the drill 13.

Also shown in FIG. 4 is a flushing fluid supply line 29 for supplying water to the drill 13.

Figure 5:
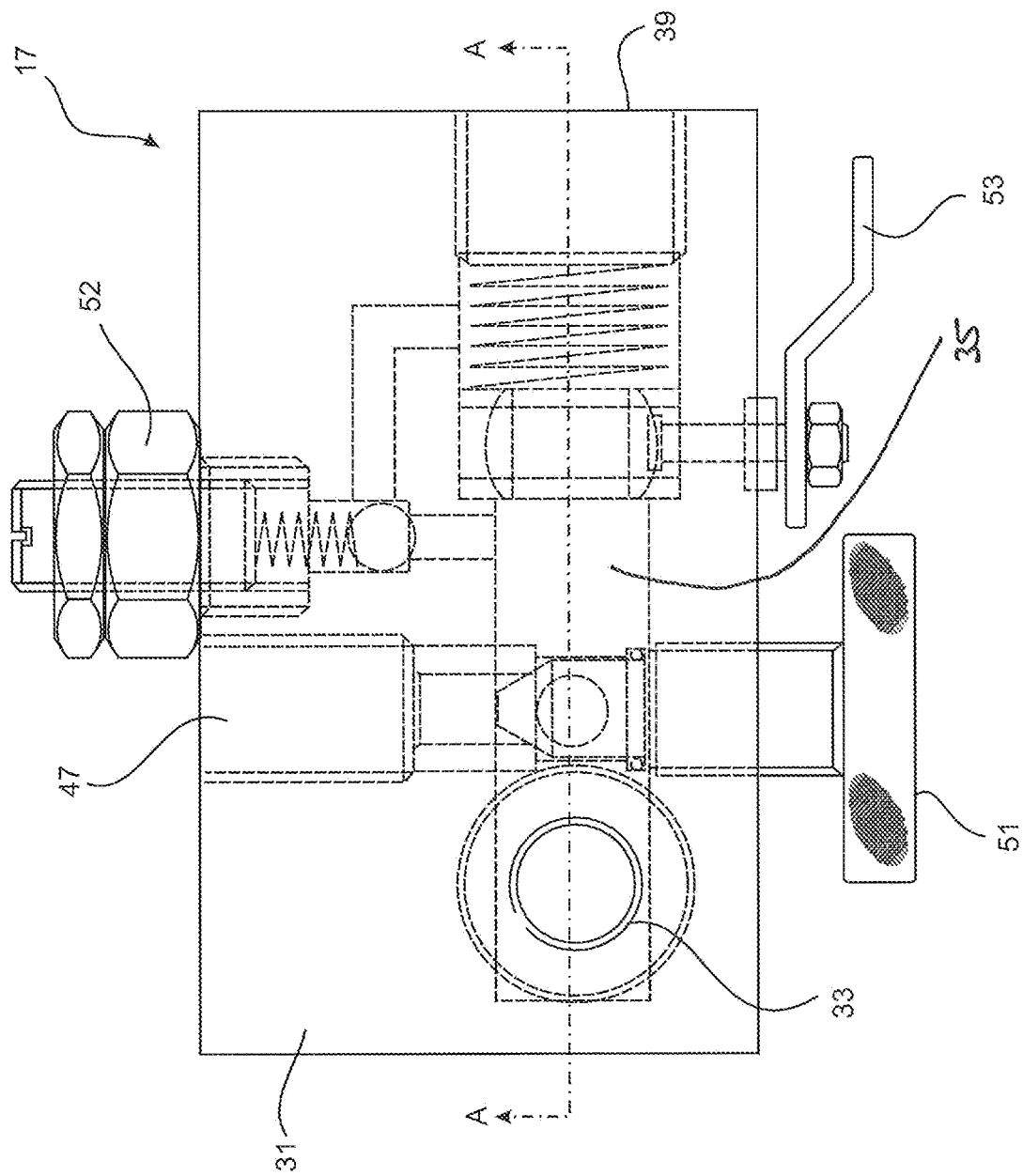
FIG. 5 is a plan view of the valve shown in FIG. 1.
Figure 6:
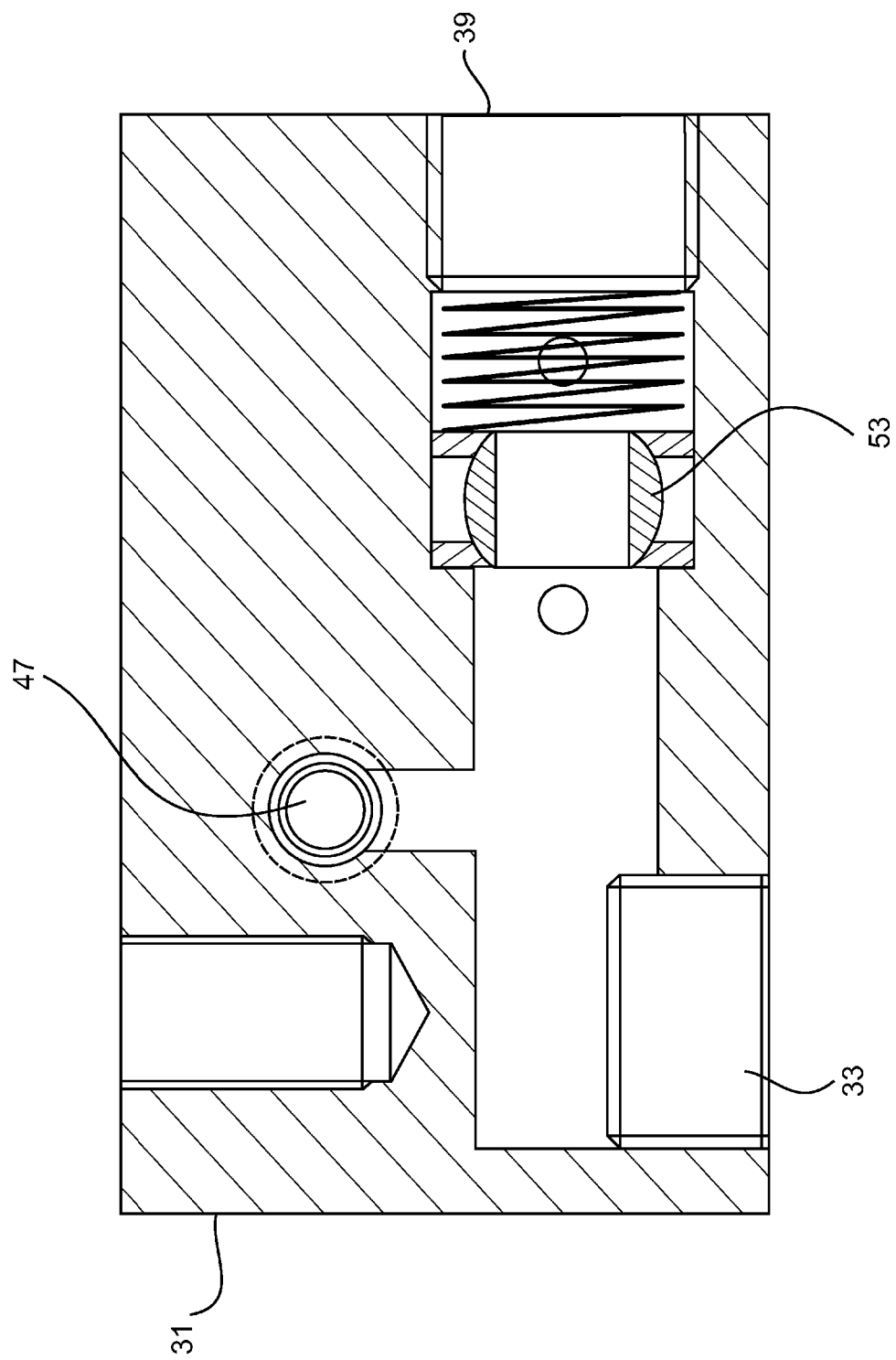
FIG. 6 is a view of the valve in FIG. 5 taken through section AA.

Referring to FIGS. 5 and 6, the valve 17 comprises a body 31 having a number of inlets and outlets which control the delivery of hydraulic fluid to the drill 13 and the support leg 15.

The valve 17 comprises a first valve inlet 33 which is connected to the power pack 19 by first fluid supply line 21. The first valve inlet 33 is connected to a chamber 35 located within the valve body 31. A return outlet 37 is also connected to the chamber 35 and allows fluid to flow from the valve 17 to return to the power pack 19 through first fluid return line 25.

The valve 17 also provides a first valve outlet 39 having a second fluid supply line 41 fitted thereto. The second fluid supply line 41 supplies fluid from the first valve outlet 39 to a drilling inlet 43. This fluid drives the drill 13. The drill has a drill outlet 45 to which is fitted the second fluid return line 27 through which fluid is returned to the power pack 19 from the drill 13. In this embodiment, the valve 17 incorporates a tee-piece (not shown) having one end connected to the first valve outlet 39. The tee piece is connected to the first valve inlet 33, whereby the first fluid supply line 21 is connected to the other branch of the tee-piece for supplying the fluid from the power pack 19.

The valve 17 also has a second valve outlet 47 for supplying fluid to the support leg 15. The fluid enters the support leg 15 at an upper end 49 thereof. In this embodiment the fluid flow to and from the support leg 15 is through the second valve outlet 47. This enables the support leg 15 to be readily extended and contracted as required. Furthermore, as the hydraulic power is provided by the power pack, the pressure required by the support leg (and drill) is available as soon as it is required, the support leg does not need to wait for the pressure in the supply line to build up to the required pressure before the support leg can be adjusted, as is the case with the prior art.

The valve 17 also provides a throttle 51 which is associated with the second valve outlet 47. The throttle 51 can be readily adjusted by an operator to control the amount of fluid passing into and out of the support leg 15. When drilling, an operator can operate the throttle 51 to extend (or contract) the support leg 15 as required.

The valve 17 also incorporates a regulator 52 which sets a parameter which, if exceeded, results in the flow of fluid to the drill 13 being blocked. Such an event may occur where the pressure in the support leg 15 exceeds a certain pressure. When this happens the fluid is prevented from flowing to the drill, and therefore suspending the drilling operation.

The valve further comprises a dump valve 53 located within the chamber 35. When in a dumped position, the fluid passes straight through the chamber 35 to return directly to the power pack 19. In this position no fluid passes to the support leg 15 or the drill 13.

Figure 7A:
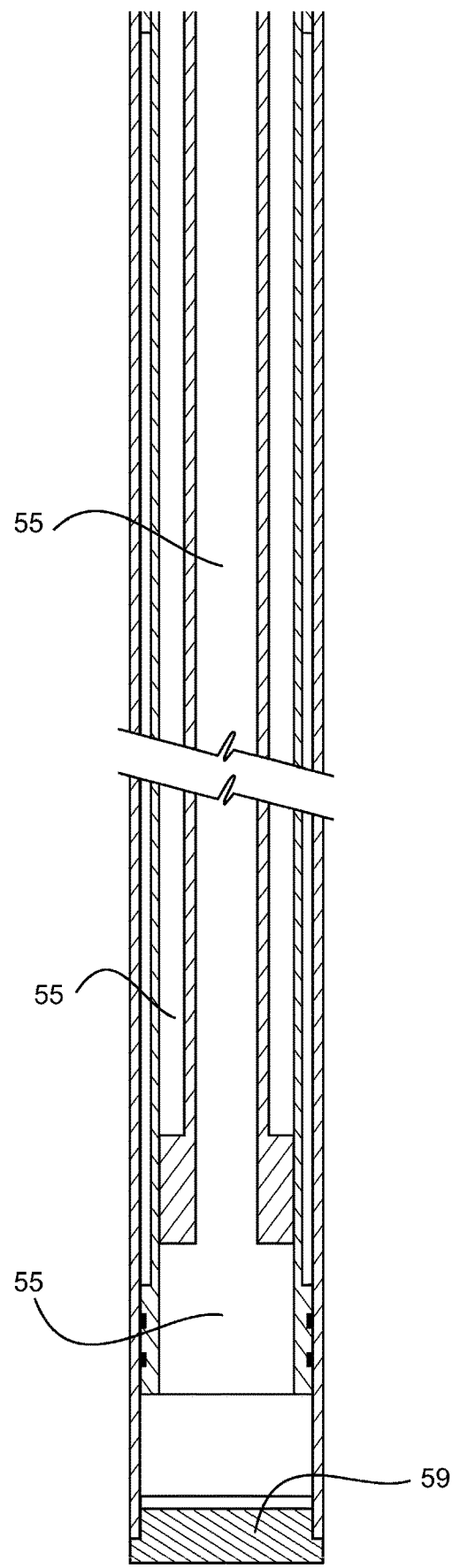
FIGS. 7a, 7b are cross sectional views of the support shown in FIG. 1.
Figure 7B:
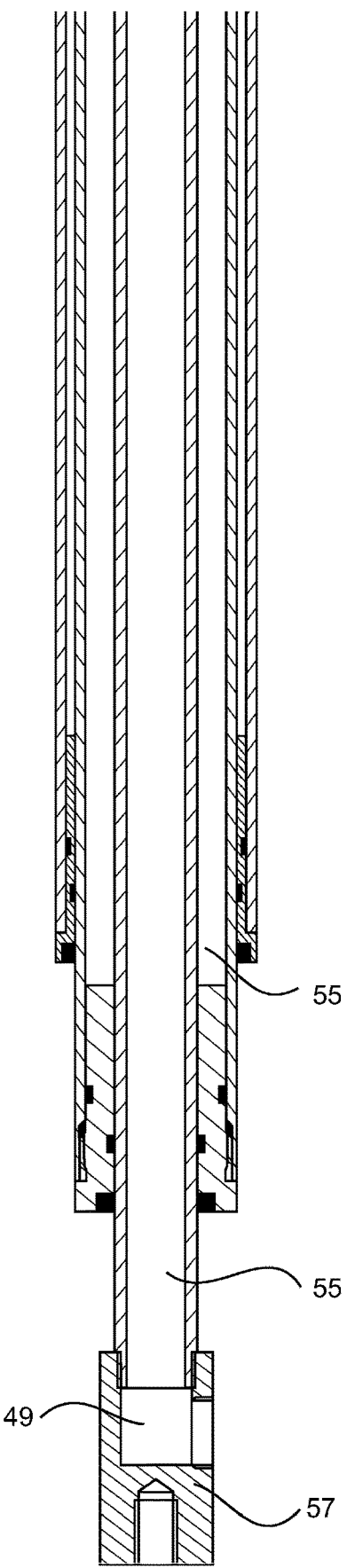
Figure 8:
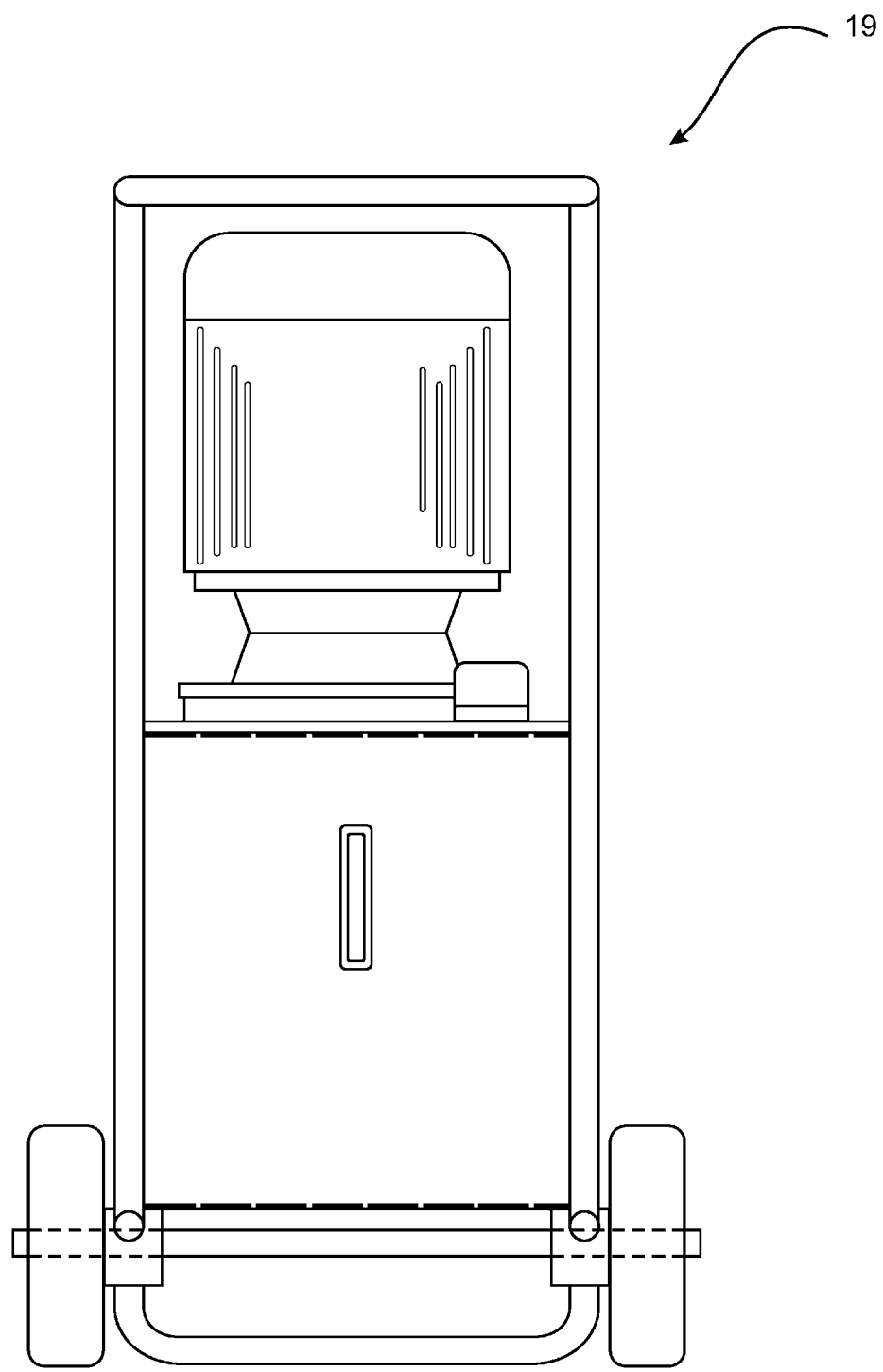
FIGS. 8, 9 are views of the power pack shown in FIG. 1.
Figure 9:
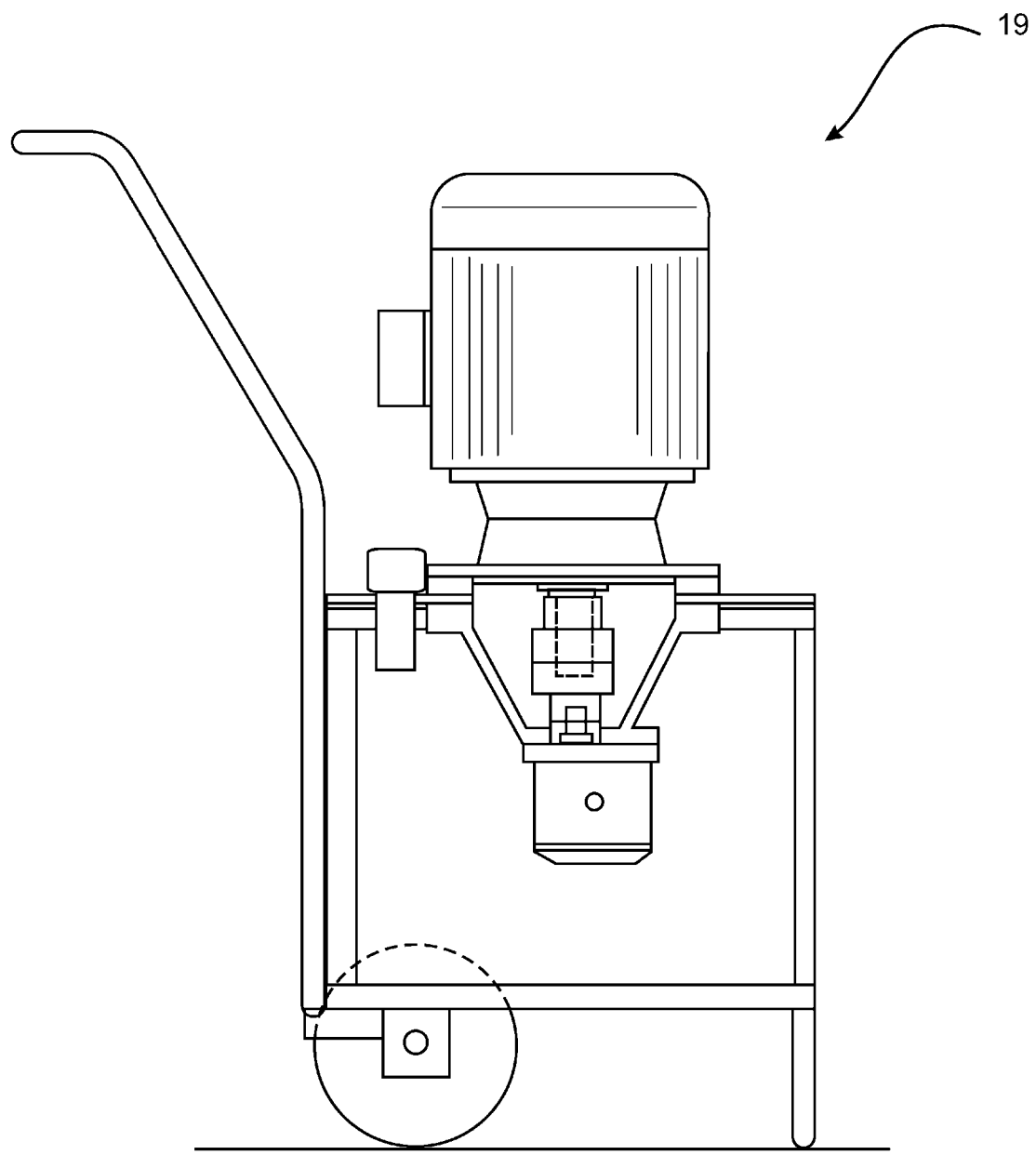

The support leg 15 is of the telescopic type, as shown in FIGS. 7a, 7b. In operation fluid enters the support leg 15 and fills voids 55. By opening the throttle 51, a greater volume of fluid enters the support leg 15 causing the support leg 15 to extend. To contract the support leg 15 the dump valve 53 is placed in its dump position to allow fluid to escape the support leg 15 and return to the power pack 19.

The support leg 15 has a first end 57 releasably secured to the valve 17. Once secured to the valve the support leg can be rotatably adjusted relative to the drill 13. The support leg 15 comprises a second end 59 adapted to engage a surface, such as the floor.

In operation, the power pack 19 is activated and fluid is supplied to the drilling assembly 11. Once the power pack is in operation the drilling assembly 11 has a ready supply of fluid at the required pressure. With the present invention there is no requirement to install infrastructure to supply pressurised air/fluid from the surface. This saves on significant infrastructure costs. Furthermore, as both the support leg and drill operate on hydraulic power, there is a significant reduction in noise and dust, as well as exhaust, which would otherwise be experienced if the drill and/or support leg were of the pneumatic type.

As the present invention is operable under its own mobile power pack, the drilling assembly 11 can be set up and used for drilling very quickly without the need for significant infrastructure works. It can also be readily utilised where only a small amount of drilling is required.

Before drilling commences the throttle 51 on the valve 17 is adjusted to set the support leg 15 at the required length. The operator can then control the drill throttle to commence the drilling operation.

The valve is connected to the power pack through a tee piece: fluid in port 1 is from the power pack, fluid to the valve is through port 2, and fluid from port 3 goes to the drill.

Fluid to support leg on entering valve port 2 is fed to the support leg by way of a flow adjuster valve. The fluid enters the support leg through the valve outlet/intel port the exiting fluid from the support leg goes through a discharge port by way of a discharge valve.

The pressure between the flow adjuster and the support leg is regulated to a predetermined pressure by a pre-set pressure reducing valve. When the pressure exceeds the predetermined value fluid is dumped directly into the return port back to the power pack.

There is a valve fitted to facilitate fluid return to the power pack when the support leg is manually retracted.

Modifications and variations such as would be apparent to the skilled addressee are considered to fall within the scope of the present invention.

While the invention has been shown and described with reference to certain exemplary embodiments thereof, it will be understood by those skilled in the art that various changes in form and details may be made therein without departing from the spirit and scope of the invention as defined by the appended claims.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprise", "comprises," "comprising," "including," and "having," or variations thereof are inclusive and therefore specify the presence of stated features, integers, steps, operations, elements, and/or components, but do not preclude the presence or addition of one or more other features, integers, steps, operations, elements, components, and/or groups thereof.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Such variations are not to be regarded as a departure from the disclosure, and all such modifications are intended to be included within the scope of the disclosure.

The invention claimed is:

1. A drill assembly comprising a drill for drilling rock, a support for supporting the drill, a valve for releasably securing the support and drill together, whereby, in use, the valve receives a fluid from a pump that supplies fluid to the drill assembly and receives fluid from the drill assembly and controllably provides the drill and the support with the fluid for operation of the drill and the support, wherein the pump is in fluid communication with the valve, the valve is in fluid communication with the drill, the valve is in fluid communication with the support, and the drill is in fluid communication with the pump, wherein the drill has three modes of operation, a forward mode wherein a force exerted through a drill bit drives the drill bit forward, a neutral mode wherein no force is exerted through the drill bit, and a reverse mode wherein the drill is rotated in a reverse direction to decouple the drill from the drill bit.

2. The drill assembly of claim 1, wherein the support is a support leg, the support leg having a first end adapted to be releasably secured to the valve, and a second end adapted to engage with or be supported upon a surface.

3. The drill assembly of claim 2, wherein the valve has a second valve outlet, the second valve outlet being in fluid communication with a support inlet for delivering fluid to the support leg, wherein the fluid from the power pack flows through tea first valve inlet, through the second valve outlet and into the support leg through the support inlet to activate the support leg.

4. The drill assembly of claim 3, wherein the pump is a portable hydraulic power pack and wherein the fluid from the support leg returns to the valve, passing through a support outlet and into a second valve inlet of the valve, before passing through a return outlet back to the portable hydraulic power pack.

5. The drill assembly of claim 4, wherein the fluid from the valve enters and exits the support leg through the same pathway, the support outlet and the support inlet being provided at the same opening of the support leg, and the second valve inlet and the second valve outlet being provided at the same opening of the valve.

6. The drill assembly of claim 2, wherein the valve has a throttle for regulating a flow of fluid to the support leg, the throttle allowing for rapid extension and contraction of the support leg.

7. The drill assembly of claim 1, wherein the drill comprises a housing which supports the drill bit, the housing threadingly engages a drill steel, whereby the drill steel has the drill bit at an opposed end for engaging a rock formation.

8. The drill assembly of claim 1, wherein the pump is a portable hydraulic power pack, the portable hydraulic power pack provides a pressurized hydraulic fluid to the drill assembly.

9. The drill assembly of claim 8, wherein the valve comprises a first valve inlet for receiving the fluid from the portable hydraulic power pack.

10. The drill assembly of claim 9, wherein the first valve inlet is in fluid communication with a first valve outlet, and the first valve outlet is in fluid communication with a drill inlet.

11. The drill assembly of claim 10, wherein the fluid from the power pack flows through the first valve inlet, through the first valve outlet and into the drill inlet to operate the drill.

12. The drill assembly of claim 10, wherein the valve comprises a three-way joiner, wherein a first branch provides the first valve outlet, a second branch is connected to the power pack and a third branch provides the first valve inlet.

13. The drill assembly of claim 10 wherein the valve incorporates an adjustable regulator to prevent a flow of fluid to the drill inlet when a pressure of the fluid being delivered to the support is outside predetermined set parameters.

14. The drill assembly of claim 8, wherein the drill has a drill outlet, the drill outlet being in fluid communication with the power pack whereby the fluid flows through the drill outlet back to the power pack.

15. The drill assembly of claim 8, wherein the valve has a dump valve for dumping fluid back to the power pack, whereupon operation of the dump valve causes the fluid to pass straight through the valve without flowing to the drill or support leg.

16. The drill assembly of claim 1 wherein the drill is adapted to be driven by the fluid entering the drill in both directions, such that when the drill is driven in one direction the drill is in forward mode and when the drill is driven in the other direction the drill is in reverse mode.

17. A drill assembly comprising:
a drill for drilling rock;
a support for supporting the drill;
a valve for releasably securing the support and drill together; and
a pump to deliver fluid to, and receive the fluid from the drill;
wherein while in use the valve receives a fluid from the pump and controllably provides the drill and the support with the fluid for operation of the drill and the support; and
wherein the pump is in fluid communication with the valve, the valve is in fluid communication with the drill, the valve is in fluid communication with the support, and the drill is in fluid communication with the pump; and
wherein the drill has three modes of operation, a forward mode wherein a force exerted through a drill bit drives the drill bit forward, a neutral mode wherein no force is exerted through the drill bit, and a reverse mode wherein the drill is rotated in a reverse direction to decouple the drill from the drill bit.

18. A drill assembly comprising:
a drill for drilling rock and having a drill inlet and a drill outlet;
a support for supporting the drill;
a valve for releasably securing the support and the drill together such that they value operably supplies a fluid to the drill and the support and receives fluid from the drill and the support and wherein the valve comprises a three way joiner, wherein a first branch provides a first valve outlet in fluid communication with the drill inlet to allow fluid into the drill, a second branch, which is connected to a fluid source, and a third branch that includes a first valve inlet; wherein the drill outlet is in fluid communication with the fluid source such that the fluid flows through the drill outlet back to the fluid source; and
wherein the drill has three modes of operation, a forward mode wherein a force exerted through a drill bit drives the drill bit forward, a neutral mode wherein no force is exerted through the drill bit, and a reverse mode wherein the drill is rotated in a reverse direction to decouple the drill from the drill bit.

19. The drill assembly of claim 18, wherein the support further comprise a support inlet and a support outlet and wherein the valve further comprises a second valve outlet, the second valve outlet in fluid communication with the support inlet for delivering fluid to a support leg, wherein the fluid flows through the first valve inlet, through the second valve outlet and into the support leg through the support inlet to activate the support leg and wherein the fluid from the support leg returns to the valve, passing through the support outlet and into a second valve inlet of the valve, before passing through a return outlet as the fluid returns to the fluid source and wherein the valve further comprises an adjustable regulator to prevent a flow of fluid to the drill inlet when a pressure of the fluid being delivered to the support leg is outside a predetermined set of parameters; and wherein the valve further comprises a throttle for regulating the flow of fluid to the support leg, the throttle allowing for rapid extension and contraction of the support leg; and wherein the drill is adapted to be driven by the fluid entering the drill in both directions, such that when the drill is driven in one direction the drill is in a forward mode and when the drill is driven in the other direction the drill is in a reverse mode.

* * * * *